(12) United States Patent  (10) Patent No.: US 9,563,710 B2
Zhang  (45) Date of Patent: Feb. 7, 2017

(54) SMOOTH NAVIGATION BETWEEN CONTENT ORIENTED PAGES

(71) Applicant: Wei Zhang, Shanghai (CN)

(72) Inventor: Wei Zhang, Shanghai (CN)

(73) Assignee: SAP SE, Walldorf (DE)

( * ) Notice: Subject to any disclaimer, the term of this patent is extended or adjusted under 35 U.S.C. 154(b) by 438 days.

(21) Appl. No.: 13/956,021

(22) Filed: Jul. 31, 2013

(65) Prior Publication Data

US 2015/0033104 A1  Jan. 29, 2015

(30) Foreign Application Priority Data

Jul. 26, 2013  (CN) .......................... 2013 1 0320891

(51) Int. Cl.
  *G06F 17/00*  (2006.01)
  *G06F 17/30*  (2006.01)
  *G06Q 30/02*  (2012.01)

(52) U.S. Cl.
  CPC ... *G06F 17/30873* (2013.01); *G06F 17/30899* (2013.01); *G06Q 30/0277* (2013.01)

(58) Field of Classification Search
  CPC .................... G06F 17/30873; G06F 17/30899; G06Q 30/0277
  See application file for complete search history.

(56) References Cited

U.S. PATENT DOCUMENTS

| | | |
|---|---|---|
| 6,675,212 B1 | 1/2004 | Greenwood |
| 6,735,586 B2 | 5/2004 | Timmons |
| 6,826,595 B1 | 11/2004 | Barbash et al. |
| 7,117,443 B1 | 10/2006 | Zilka et al. |
| 7,496,855 B2 | 2/2009 | Guido et al. |
| 7,669,146 B2 | 2/2010 | Lauff |
| 7,669,149 B2 | 2/2010 | Dietl et al. |
| 7,725,875 B2 | 5/2010 | Waldrep |
| 8,086,726 B2 | 12/2011 | Hofmann |
| 8,117,553 B2 | 2/2012 | Danninger et al. |
| 8,171,399 B2 | 5/2012 | Coppedge, III et al. |
| 8,413,046 B1 | 4/2013 | Mocanu |
| 8,433,996 B2 | 4/2013 | Paulsami et al. |
| 8,548,848 B1 * | 10/2013 | Shaw ..................... G06Q 30/00 705/14.1 |
| 2002/0052925 A1 * | 5/2002 | Kim ........................ H04L 29/06 709/217 |
| 2002/0169868 A1 | 11/2002 | Lopke et al. |

(Continued)

FOREIGN PATENT DOCUMENTS

EP  2079218 A1  7/2009

OTHER PUBLICATIONS

Extended European Search Report for EP14178711.9 dated Nov. 24, 2014; 9 pages.

(Continued)

*Primary Examiner* — Andrew McIntosh
(74) *Attorney, Agent, or Firm* — Fountainhead Law Group P.C.

(57) ABSTRACT

Smooth navigation can be provided when switching between content oriented pages by presenting an intermediate page while the requested page is being received and rendered. The intermediate page can be the current page but without navigational features. Alternatively, the intermediate page can be an advertisement provided by the source of the requested page.

20 Claims, 8 Drawing Sheets

(56) References Cited

U.S. PATENT DOCUMENTS

| | | |
|---|---|---|
| 2005/0102636 A1 | 5/2005 | McKeon et al. |
| 2008/0059571 A1* | 3/2008 | Khoo ................. G06Q 30/0247 |
| | | 709/203 |
| 2012/0066586 A1 | 3/2012 | Shemesh |
| 2012/0084346 A1 | 4/2012 | Mickens |
| 2015/0234798 A1* | 8/2015 | Mocanu .............. G06F 17/2247 |
| | | 715/236 |

OTHER PUBLICATIONS

Invitation pursuant to Article 94(3) and Rule 71(1) EPC dated Feb. 8, 2016 for EP Appln. 14178711.9; 4 pages.

* cited by examiner

SMOOTH NAVIGATION BETWEEN CONTENT ORIENTED PAGES

BACKGROUND

Unless otherwise indicated herein, the approaches described in this section are not prior art to the claims in this application and are not admitted to be prior art by inclusion in this section.

Internet websites and content oriented applications are commonly used today to disseminate information or to complete assignments and tasks. A user can navigate through the websites or content oriented applications by submitting requests for a new page of content. This request can be in the form of a user interface command such as clicking navigational links, manipulation of objects shown on the screen, or touch gestures. Based on the request, a new page of content can be presented. Periodically, there may be a long wait time between the request and the presentation of the new page of content. This can be due to the time required to retrieve the content and the time required to render the content, to name a few. During this long wait time a blank screen or a partially rendered page can be shown, both of which are undesirable to the user.

SUMMARY

Embodiments of the present invention relate to improved techniques for navigating between pages of content. In one embodiment a method is described for improving the user experience when switching between content oriented pages. The content oriented pages can be pages of content in a content oriented application or alternatively web pages that belong to a web site. The method can be a computer implemented method, possibly stored in non-transitory computer readable storage medium. In one embodiment, the method includes presenting, on a display, a first page of digital content having an active state set to a reading state, receiving a request to display a second page of digital content, setting the active state of the first page of digital content to a retiring state based on the request, receiving the second page of digital content, determining that the second page of digital content is ready for presentation, and presenting, on the display, the second page of digital content based on the determination, wherein a navigational link on the first page of digital content is enabled when the active state is set to the reading state, and wherein the navigational link on the first page of digital content is disabled when the active state is set to the retiring state.

In one embodiment, the active state of the first page is set to the retiring state when it is determined that the load time for the second page of digital content is greater than a predefined period of time.

In another embodiment, the method further includes presenting, on the display, an advertisement when the active state of the first page of digital content is set to the retiring state.

In another embodiment, presenting the second page of digital content includes setting the active state of the first page to a transacting state, wherein the first page of digital content is modified to include a visual notification that the second page is ready for presentation when the active state of the first page is set to the transacting state, determining that the active state of the first page has been set to the transacting state for a predefined period of time without detecting a termination request, and swapping the first page of digital content with the second page of digital content based on the determination.

In another embodiment, the visual indicator disappears in proportion to the expiration of the predefined period of time.

In another embodiment, the second page of digital content includes content and images, wherein the second page is ready for presentation when the content has been received irrespective of the images.

In another embodiment, the first page of digital content is modified to include a status indicator to illustrate the progress of receiving the second page of digital content.

The following detailed description and accompanying drawings provide a better understanding of the nature and advantages of the present invention.

DETAILED DESCRIPTION

Described herein are techniques for providing smooth navigation between content oriented pages. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A system is described for providing smooth navigation between content oriented pages. Content oriented pages can include pages of content that are presented from a content oriented application. For example, an eBook reader, an electronic catalog, and a database application are considered content oriented applications. Content oriented pages can also include pages of content that are presented through a web browser. For example, a web page from a web site is considered a content oriented page. The system includes one or more computing devices that are configured to present content to the user in the form of pages. Pages of content can be presented on a display one page at a time. While a current page is being displayed, a request for a next page of content can be received from a remote device or from local memory. In situations where the next page takes longer than desired to be retrieved and presented, a smooth navigation technique can be applied. The smooth navigation technique can include presenting an intermediate page while the next page is being received and/or rendered. The intermediate page can be the current page with minimal UI features or alternatively an advertisement. The intermediate page can be presented for the duration of time that the next page is being received and/or rendered.

Once the next page is ready for presentation, a notification can be presented on the intermediate page to inform the user that unless otherwise instructed within a predefined period of time, the next page of content shall be presented. If an instruction is received to cancel the next page, the current page can be presented again. By utilizing smooth navigation techniques, a user can view, scan, or check out other content or advertisements while the next page is being received and rendered. This creates a more desirable user experience when navigating through pages of content.

Figure 1:
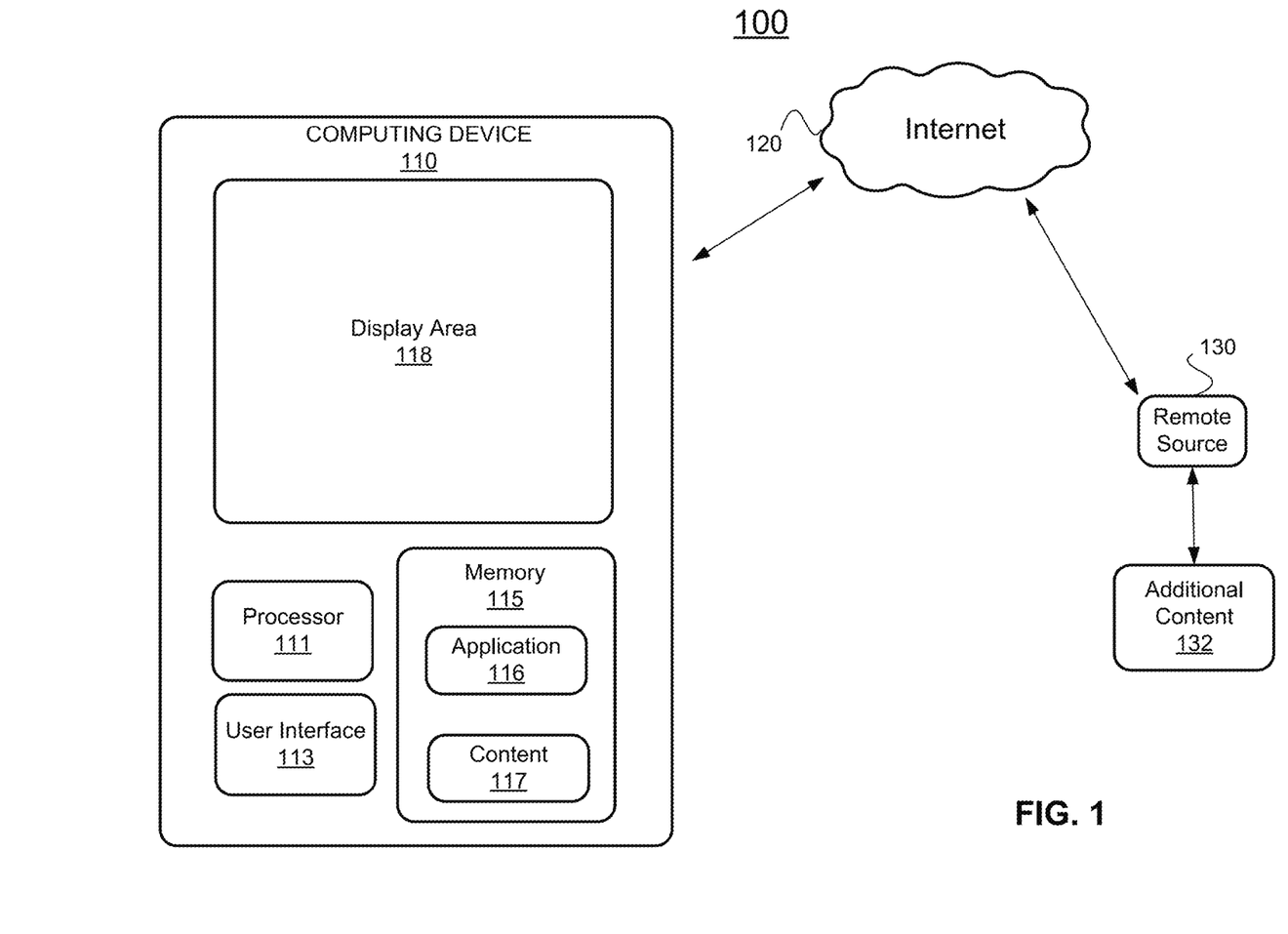
FIG. 1 illustrates an exemplary high level system diagram.

FIG. 1 illustrates an exemplary high level system diagram. System 100 includes computing device 110. Computing device 110 includes processor 111, user interface 113, memory 115, and display area 118. Processor 111 can be configured to execute application module 116 stored in memory 115. As the application is being executed, display area 118 can provide an output interface for the application while user interface 113 can provide an input interface for the application. In some examples, the user interface can include a touchpad, a keyboard, a microphone, or a camera. In other examples, a touch sensitive display can replace display area 118 and user interface 113.

Memory 115 also stores content module 117. Content module 117 includes many pages of content that can be processed by processor 111 for presentation on display area 118. In one embodiment, application 116 running on processor 111 can receive a user request for a page of content stored in content module 117. In some examples, the user request can be received by clicking a navigational link on a page of content, specifying a chapter or page to navigate to, or entering a search parameter. Application 116 can process the user request and determine whether the requested page can be presented within a predefined period of time. If the processing time of the requested page (which can include loading the page and/or rendering the page) is greater than the predefined period of time, a smooth navigation technique can be applied. Exemplary smooth navigation techniques are described in further detail below.

In another embodiment, a user request can be for a page of content that is not stored locally. Here, system 100 includes remote source 120 that is connected to computing device through internet 120. Remote source 130 includes additional content 132. Application 116 running on processor 111 can request a page of content from additional content 132 in response to a user input received from user interface 113. For example, a website can be hosted at remote source 130. A user browsing a web page belonging to the website can click on a navigational link to request another page from the website (i.e., the next page). Processor 111 can process the request by transmitting a page request to remote source 130 via internet 120. The page request can be processed by remote source 130 and an estimated load time can be transmitted to computing device 110. Based on the estimated load time, application 116 can make a determination of whether smooth navigation techniques should be applied. Generally if the load time is greater than a predefined value, smooth navigational techniques are applied to improve the user experience. If the load time is less than the predefined value, application 116 waits to receive and present the page of content from remote source 130.

In some embodiments, the determination of whether to apply a smooth navigation technique and the selection of a particular technique to apply can be independent of one another. For example, application 116 can determine whether to apply a smooth navigation technique to a given page of content. Based on the determination, application 116 can set an active state field of the page of content. Processor 111 processes a page of content for display on display area 118. Depending on the active state of the page, a smooth navigation technique can be applied. In some examples, there can be many possible smooth navigation techniques where the one chosen to be applied is determined by processor 111. Depending on the active state field of a given page, processor 111 can decide whether or not apply a smooth navigation technique. For example, processor 111 can define that smooth navigation technique 'A' should be applied when the active state is in the retiring state and that smooth navigation technique 'B' should be applied when the active state is in the transacting state. As a result, the application of the smooth navigation technique is managed by processor 111. In other examples, a single application can be configured to set the active state and also define the actions that are to take place based on the state. In other examples, logic and algorithms can replace the use of active states within the application by providing the same functionality.

Figure 2:
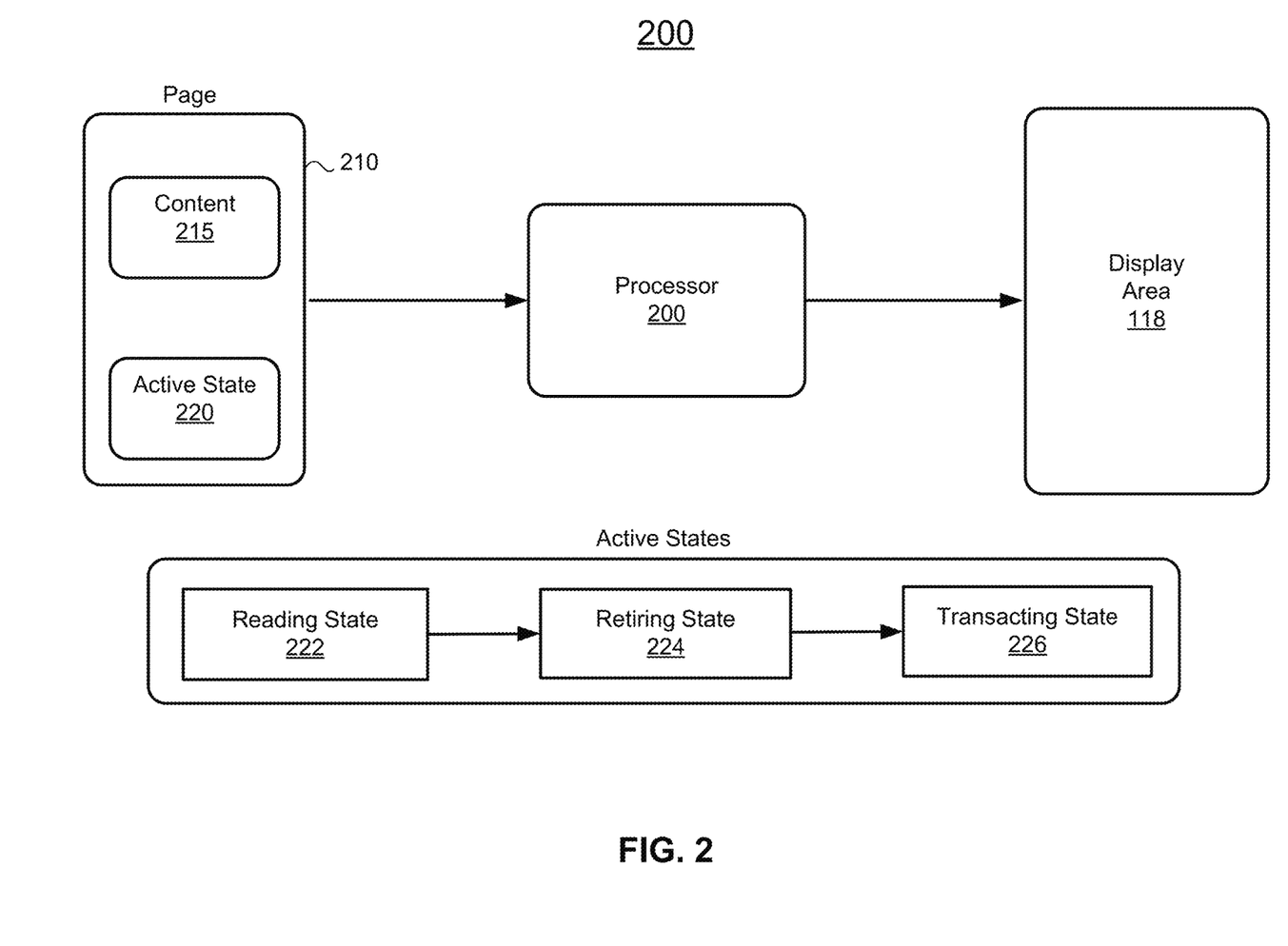
FIG. 2 illustrates an exemplary processor for displaying a page of content.

FIG. 2 illustrates an exemplary processor for displaying a page of content. As shown, processor 200 receives and processes page 210 for presentation on display area 118 of a computing device. Processing can include render content 215 of page 210 for display on display area 118 based on active state 220. Content 215 can include text, images, videos, navigational links, movable page elements, compositional metadata, and others.

When active state 220 is in reading state 222, page 210 can be displayed without any restrictions. In other words, page 210 can be presented on display area 118 with all its intended content. This can include the presentation of interactive features such as forward button, back button, and navigational links that are operational. In the example of a web page, the web page can be displayed as the author intended, thus including all the text, images, navigational links, and other interactive features. In some examples, the reading state can be the default active state for a page.

When active state 220 is in retiring state 224, an intermediate page can be presented in place of content 215. The intermediate page can be configured to provide smooth navigation between pages by proving a page of content for viewing while the next page requested is being downloaded and rendered. For example, a request is received to navigate to another page. Instead of presenting a partially rendered page as the requested page is being processed, an intermediate page is presented to the user. This can provide content that a user can glance over while waiting for the requested page, thus creating a more user-friendly environment. In one embodiment, the intermediate page can simply be a version of the current page. The version can be the current page with limited features. In one version, processor 200 can render interactive features such as text boxes, navigational links (forward and back buttons) and address bars so that they are viewable by not selectable. This allows the current page to maintain the same appearance as before thus not interrupting the user's view. The user may still be able to scroll and navigate around the page however, other interactions with the page is limited. For instance, attempting to navigate away from the intermediate page can be restricted. In another example, the current page can be presented without displaying the interactive features. For instance, processor 200 can skip rendering of the interactive features. The version can also be the current page with additional features. For example, a status bar can overlay a portion of the current page to notify the user when the requested page will be displayed. In the case of a web page, the status bar can appear at a part of the current page that is below the address bar of the web browser.

In another embodiment, the intermediate page can be a page other than the current page. For example, the intermediate page can be an advertisement that is presented to the user for the duration of time that the requested page is being processed. The advertisement can be retrieved locally or from a remote location and can be determined by the host (or author) of the requested page or by the application running on the client device. In some examples, a status bar can be presented on the intermediate page (current page, advertisement, or other) to inform the user approximately when the requested page will be ready.

The intermediate page can also be configured to receive a cancellation request. If a cancellation request is received during presentation of the intermediate page, the original version of the current page can be displayed once again. The cancellation request can be triggered through the user interface of the computing device. Examples can include a double mouse click, a swipe gesture, a touch gesture, or other. In one example, tapping another navigational link can result in two actions; a cancellation request to cancel the current transaction and a page request for the page associated with the navigational link. Thus, the current page remains in the retired state while the requested page has changed to the page associated with the selected navigational link.

When active state 220 is in transacting state 226, a notification can be presented to the user that the requested page is ready for display. In one embodiment, a fly in, banner, or other indicator (visual or audio) can be presented to the user to notify the user that the requested page will be presented shortly. In one example, a highlighted border can be added to the intermediate page. In another example where a status bar is presented on the intermediate page during the processing of the requested page, a full status bar can be presented on the intermediate page when the page is in the transacting state. In one embodiment, the notification can be displayed for a predefined period of time before the requested page is presented. During that period of time, a determination can be made as to whether user input has been detected to cancel the presentation of the requested page. For instance, a user can desire to spend more time on the current page. If user input has been detected to cancel the presentation of the requested page, processor 200 can present the original version of the current page. The user input to cancel the requested page can include a tapping, swiping, or clicking action during the predefined period of time. In one embodiment, the notification can be presented prior to the requested page being ready for presentation. This can shorten the time it takes to present the requested page. For instance if the notification is to be displayed for five seconds before presentation of the requested page, the notification can be presented five seconds before the requested page is ready. Thus, the requested page can be finalized while the notification is being presented on the intermediate page. This can reduce the delay between requesting a next page and presentation of the next page.

Figure 3:
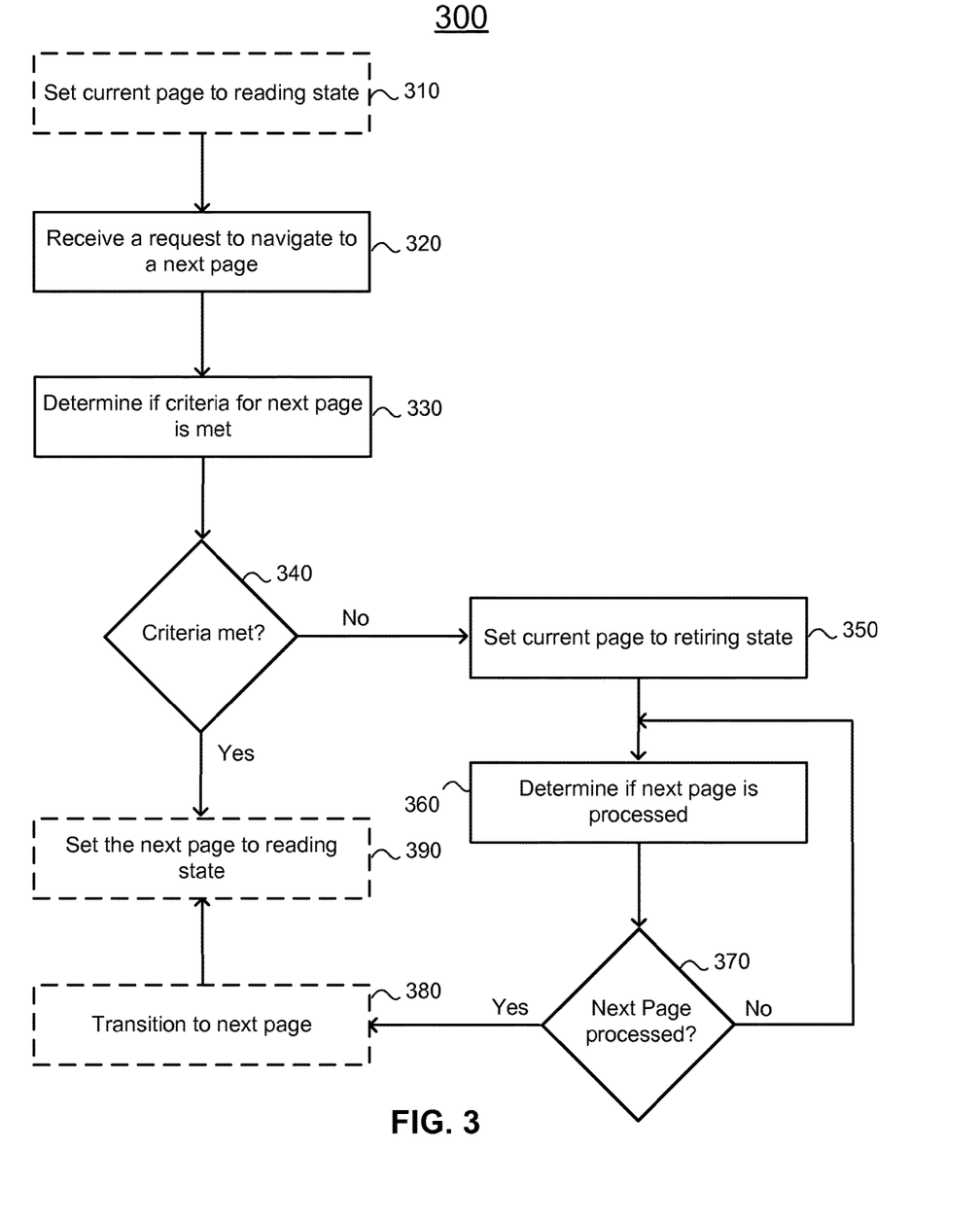
FIG. 3 illustrates an exemplary method to smoothly navigate between pages.

FIG. 3 illustrates an exemplary method to smoothly navigate between pages. Process 300 can be performed by a device such as processor 111 as described in FIG. 1. In one example, process 300 can be stored in memory 115, possibly as part of application 116 of FIG. 1. Process 300 describes one example of how an active state of a page can change as the page navigates to a next page. Process 300 can begin by optionally setting the active state of the current page to reading state at 310. Alternatively, the active state of all pages can by default be set to reading state. Process 300 can receive a request to navigate to a next page at 320. Once the request has been received, process 300 determines if criteria for the next page has been met at 330. The criteria can include one or more conditions to determine whether or not smooth navigation techniques are to be applied in this instance. In one embodiment, the criteria can include determining whether the load time of the next page is less than a predefined period of time. In one example if the load time is less than the predefined period of time, the condition can be met. In another embodiment, the criteria can include determining whether the rendering time of the next page is less than a predefined period of time. This can be applicable when the next page is stored locally and thus does not need to be retrieved from a remote source. In this instance, the majority of the processing time for the next page may come from rendering the next page for display. If the rendering time is less than the predefined period of time, the condition is met. In yet other embodiments, the rendering time and the load time can both be evaluated to determine whether the criteria has been met. If the criteria is met at 340, then the next page is presented and the active state of the next page can optionally be set to the reading state at 390.

Alternatively if the criteria is not met at 340, process 300 can continue by setting the active state of the current page to a retiring state at 350. As described above, smoothing can be performed on a current page when the active state of the current page is set to the retiring state. Various different exemplary implementations are described herein. Once the active state of the current page has been set to the retiring state, process 300 can determine if the next page has been processed at 360. Processing the next page can include receiving the contents of the next page, rendering the contents, and otherwise preparing the next page for presentation on the display. In one example, process 300 can wait for a trigger notifying it that the next page has been processed. In another example, process 300 can periodically check to see whether the next page has been processed. Once the next page has been processed at 370, process 300 can optionally transition to the next page at 380. In some examples, smooth navigation techniques can be applied as process 300 transitions to the next page. In other examples, the transition can be void and the next page can be simply presented. After optionally transitioning to the next page, the next page can be presented to the user and optionally, the next page can be set to the reading state at 390.

Figure 4:
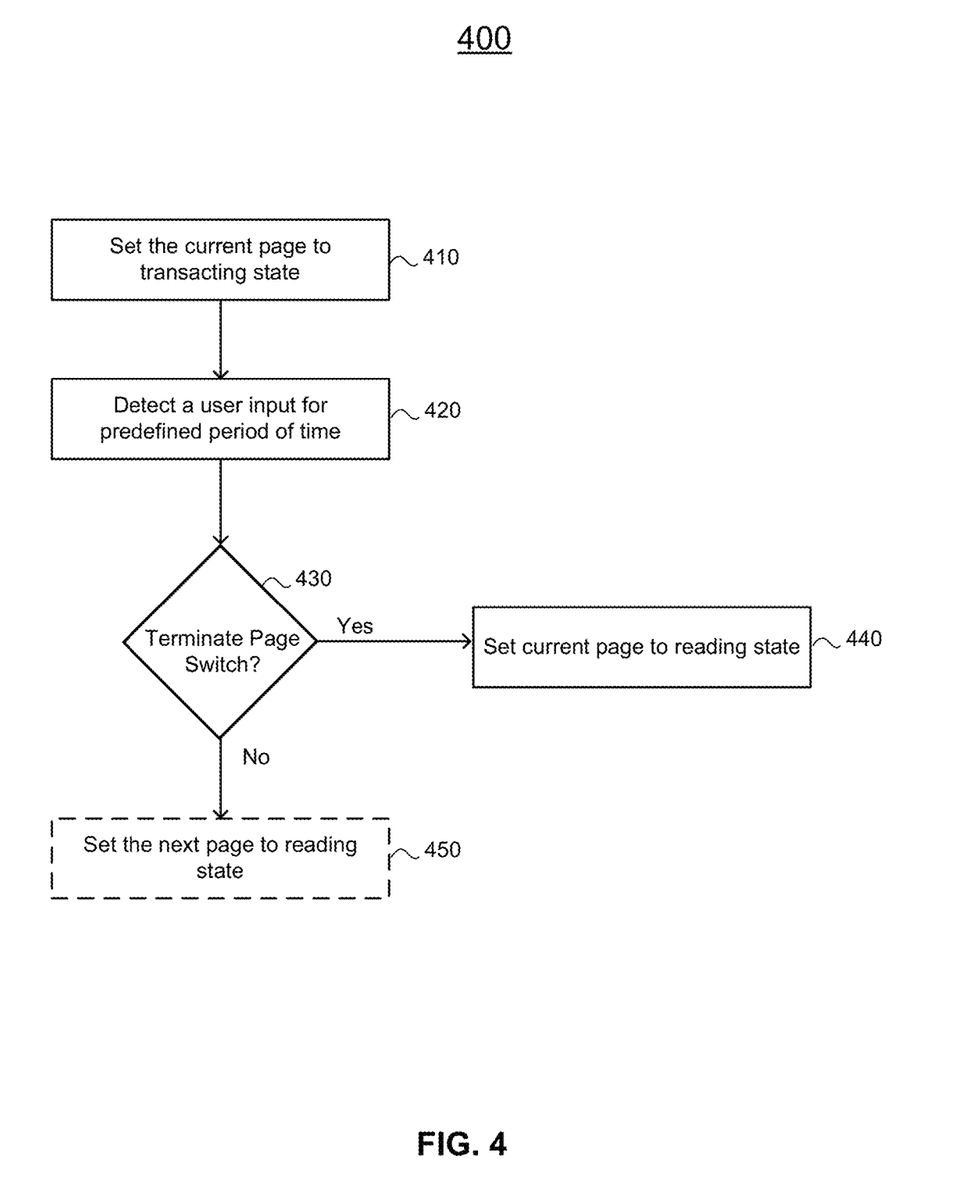
FIG. 4 illustrates an exemplary method to transition to a next page of content.

FIG. 4 illustrates an exemplary method to transition to a next page of content. Process 400 can be performed by a device such as processor 111 as described in FIG. 1. In one example, process 400 can be stored in memory 115, possibly as part of application 116 of FIG. 1. Process 400 describes an exemplary implementation transitioning from the current page to the next page similar to 380 of FIG. 3. Process 400 begins by setting the current page to transacting state at 410. A page having an active state of the transacting state can present a visual or audio notification that serves to indicate that the next page is ready. In one example, the notification can be an audible tone or series of tones. In another example, the notification can be a status bar positioned below the address bar of the web browser that is full. In yet another example, the intermediate page can be highlighted with a border to signify that the next page is ready.

Once the current page has been set to the transacting state, process 400 continues by remaining idle for a predefined period of time at 420 as it detects a user input. After the current page enters the transacting state, a timer can begin. A predefined period of time is made available to the user to terminate the request to present the next page. If during the period of time a termination request is detected to terminate the page switch at 430, presentation of the current page can resume and the active state of the current page can be set to the reading state at 440. Alternatively if during the period of time a termination request is not detected, presentation of the next page can begin and the active state of the next page can optionally be set to the reading state at 450. Depending on the implementation details, the termination request can be a double click of the mouse, a swipe gesture, or a tap gesture. In some examples, the termination request can also be a next page request. For instance, a tap gesture or clicking action on another navigational link while in the transacting state can be interpreted as a termination request followed by a next page request for the page that is associated with the navigational link.

Figure 5:
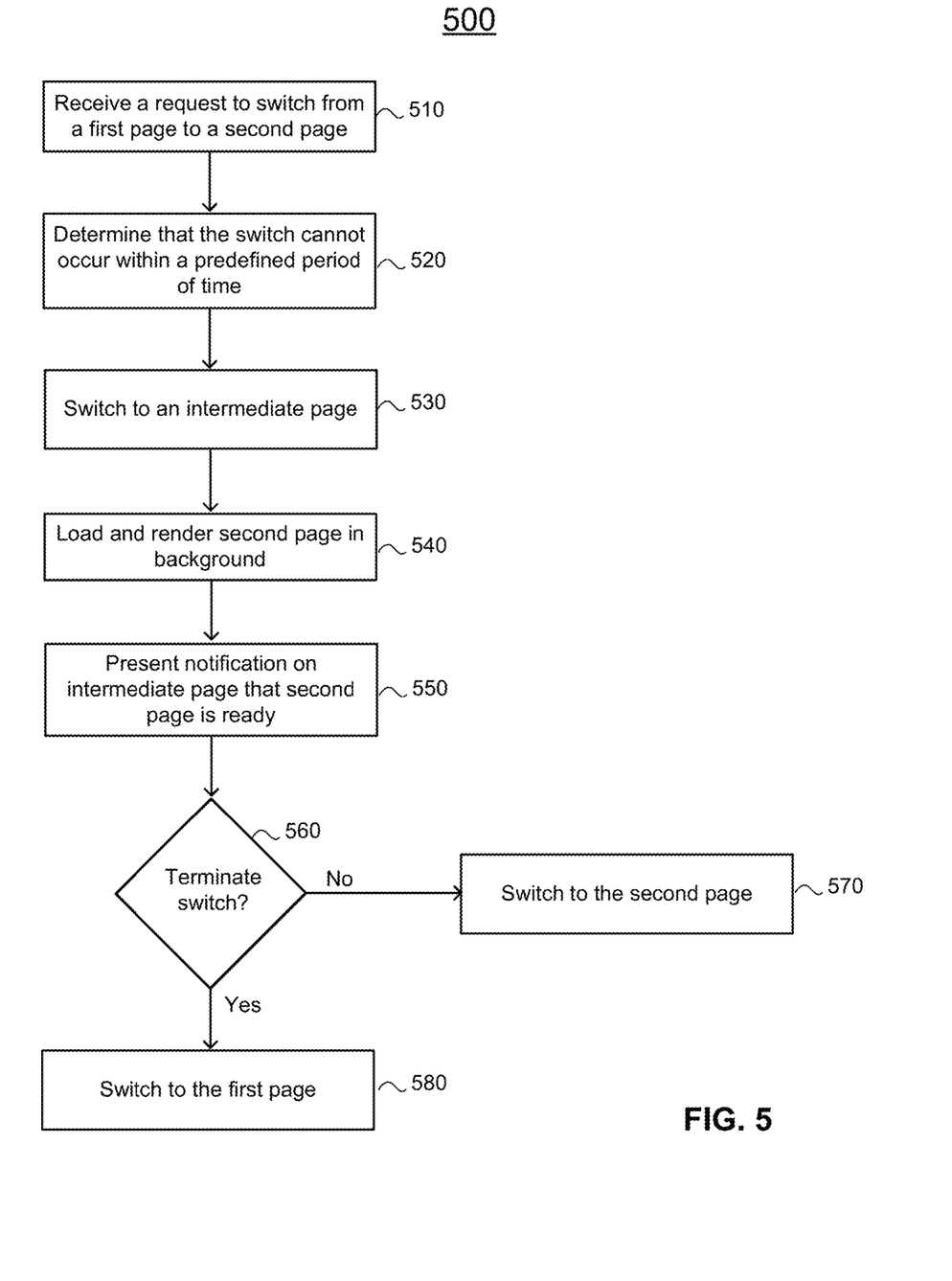
FIG. 5 illustrates another exemplary method to smoothly navigate between pages.

FIG. 5 illustrates another exemplary method to smoothly navigate between pages. Process 500 can be performed by a device such as processor 111 as described in FIG. 1. In one example, process 500 can be stored in memory 115, possibly as part of application 116 of FIG. 1. Process 500 describes another example of providing smooth navigation between pages without use of an active state field. The logic to determine when and how to perform the smooth navigation is included in the process. Process 500 begins by receiving a request to switch from a first page to a second page at 510. The request can be the selection of a navigational link, the selection of an entry of a URL or search term into an address bar, the manipulation of interactive elements on a web page, or other. Once the request is received, a determination is made that the switch cannot occur within a predefined period of time at 520. In some examples, the determination can include estimating the time needed to switch pages, which can include loading time, rendering time, etc.

Once it is determined that the switch cannot occur within the predefined period of time, the first page is switched for an intermediate page at 530. The intermediate page can take on various forms. In one example, the intermediate page can be an advertisement that is provided by the computing device. In another example, the intermediate page can be an advertisement that is provided by the source of the second page. In yet another embodiment, a switch may not occur from the first page to the intermediate page. Instead, a different version of the first page is presented. The different version can include disabling interactive features, hiding interactive features, and/or adding in features that monitor the status of setting up the second page. For example, a status bar can be presented on the first page that indicates the progress of the loading and rendering of the second page. After the intermediate page is shown, the second page can be loaded and rendered in the background at 540. For example, a background process can load and render the second page as the intermediate page is being presented.

Once the second page has been loaded and rendered, a notification can be presented on the second page indicating that the second page is ready at 550. In one example, the notification can include a border around the intermediate page (or version of the first page, depending on implementation). In another example, the notification can alternatively be a status bar that is full. The status bar, when full, can change to a different color. In yet another example, the notification can be an audible sound. Once the notification has been presented, process 500 can detect for a termination request for a predefined period of time at 560. A termination request can be an input received that is configured to terminate the switch to the second page. This can occur if the user no longer desires to switch from the first page to the second page. In one example, the termination request can be a tap gesture, swipe gesture, or click gesture performed on an interface device such as a mouse or a touch screen. If a request to terminate the switch is detected at 560, then process 500 switches to back to the first page at 580. This can be the original version of the first page. If the request to terminate the switch is not detected at 560 during the predefined period of time, process 500 switches to the second page at 570.

Figure 6:
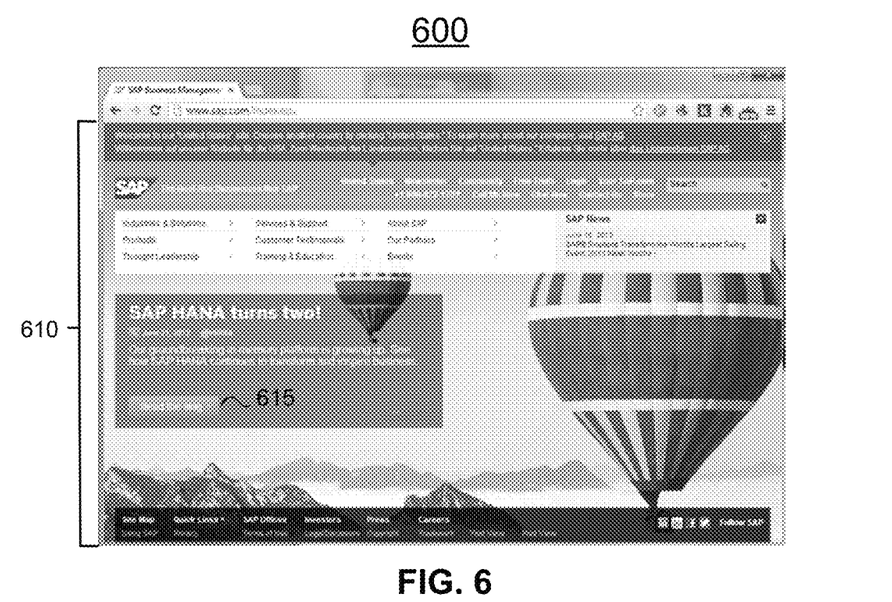
FIG. 6 illustrates an example of a web browser displaying a page of content in the reading state.

FIGS. 6 to 9 illustrate exemplary screen shots of a page of content as the page is in different active states. FIG. 6 illustrates an example of a web browser displaying a page of content in the reading state. As shown, page 610 is presented with text, images, and navigational links that are enabled. A user using a touch screen can select navigational link 615 to read the blog related to "SAP HANA turns two!" When selected, the page of content can enter a retiring state. In the retiring state, the page of content can appear the same as page 610. However, the navigational links may be disabled. Alternatively, an advertisement can be presented in place of the page of content when the page of content is in the retiring state.

Figure 7:
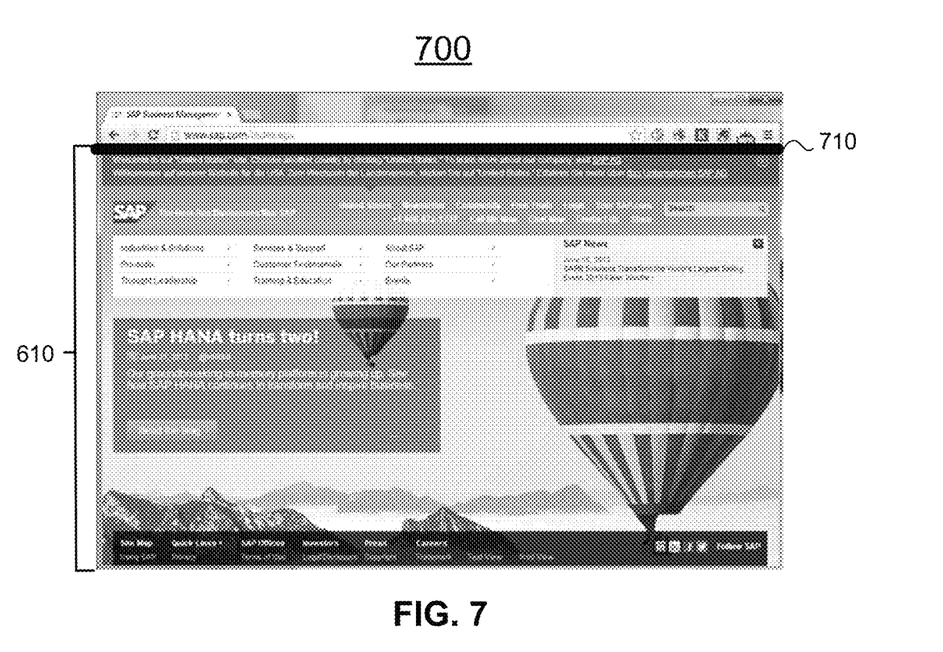
FIG. 7 illustrates an example of a web browser displaying a page of content in the transacting state.
Figure 8:
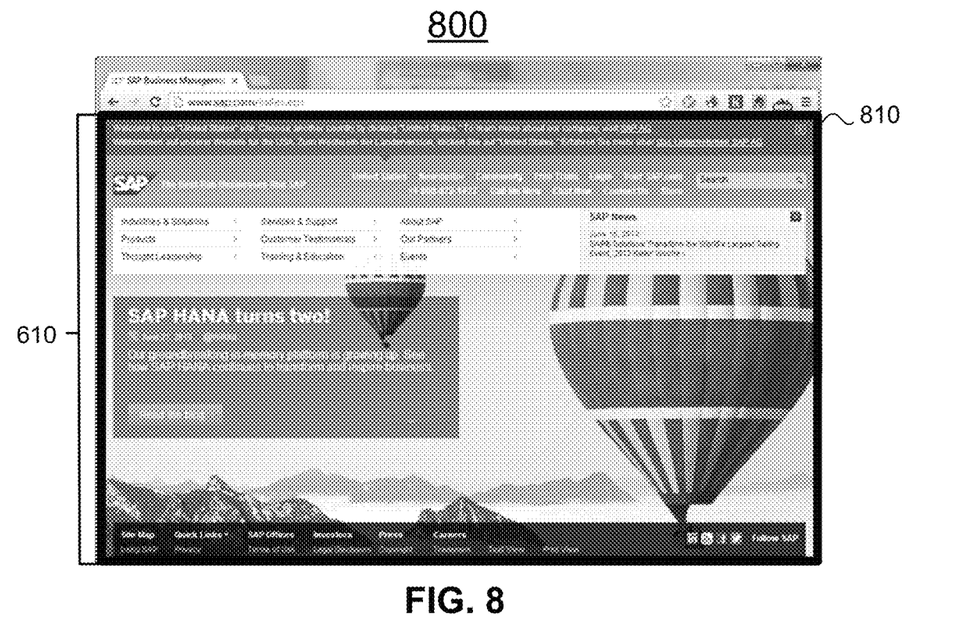
FIG. 8 illustrates another example of a web browser displaying a page of content in the transacting state.
Figure 9:
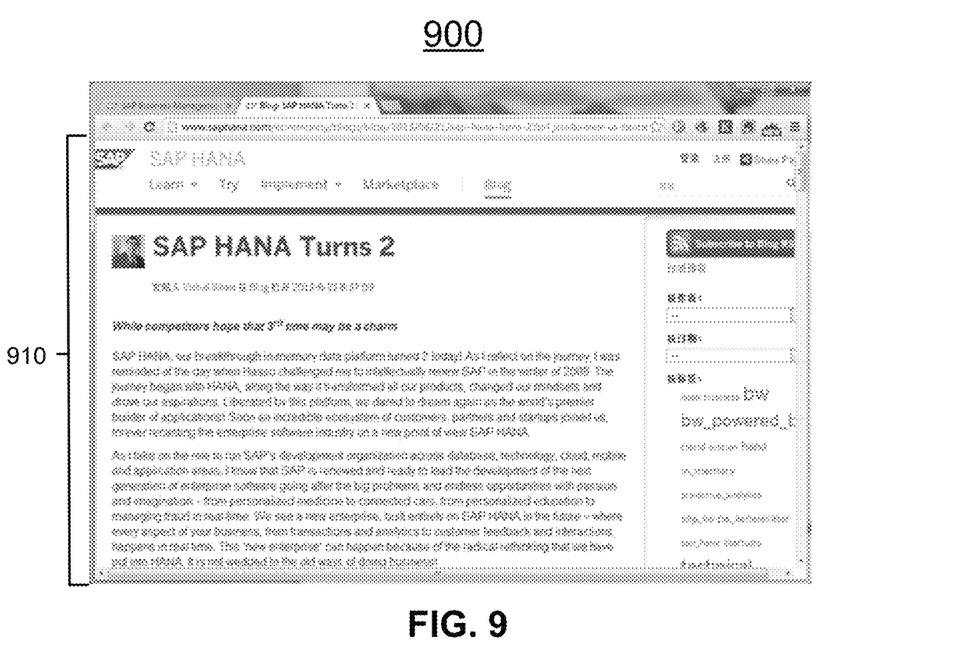
FIG. 9 illustrates an example of a web browser displaying the next page of content after the termination period has expired.

FIG. 7 illustrates an example of a web browser displaying a page of content in the transacting state. As shown, page 610 is still presented with the same text, images, and navigational links. However, the navigational links are disabled. Page 610 further includes status bar 710. Status bar 710 can be displayed to notify the user that the next page is ready for presentation. In one example, status bar 710 can become shorter as the predefined period of time for the user to terminate the switch to the next page expires. In one example, the status bar can become shorter in proportion to the expiration of the period of time. FIG. 8 illustrates another example of a web browser displaying a page of content in the transacting state. As shown border 810 is displayed along the border of page 610. In one example, the border can disappear as the predefined period of time for the user to terminate the switch to the next page expires. The border can disappear in proportion to the expiration of the predefined period of time. FIG. 9 illustrates an example of a web browser displaying the next page of content after the termination period has expired. As shown, the web browser is presenting page 910, which includes text, images, and navigational links. The text and images are related to the topic "SAP HANA Turns 2."

Figure 10:
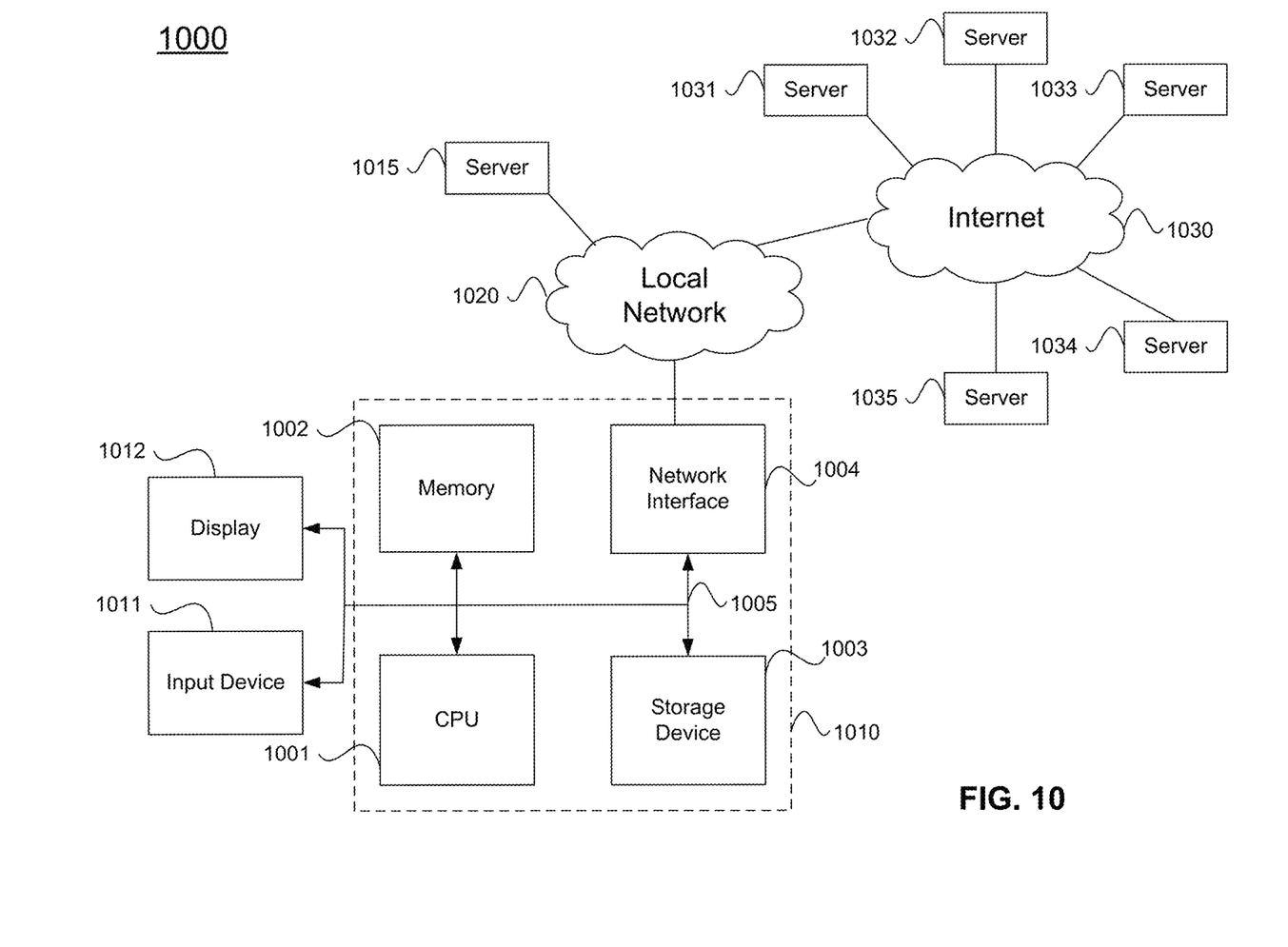
FIG. 10 illustrates an exemplary computer system.

An exemplary computer system 1010 is illustrated in FIG. 10. Computer system 1010 includes a bus 705 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
presenting, on a display, a first page of digital content having an active state set to a reading state, wherein the first page of digital content includes a navigational link that is enabled;
receiving a request to display a second page of digital content;
in response to the request, setting the active state of the first page of digital content to a retiring state;
in response to detecting that the active state of the first page of digital content is the retiring state, presenting, on the display, a version of the first page of digital content that includes the navigational link that is disabled;
receiving the second page of digital content;
determining that the second page of digital content is ready for presentation;
in response to the determination, setting the active state of the first page of digital content to a transacting state;
upon determining that the active state of the first page of digital content has been set to the transacting state for a predefined period of time without receiving a termination request, presenting, on the display, the second page of digital content; and
upon determining that the termination request is received within the predefined period of time, setting the active state of the first page of digital content to the reading state and presenting the first page of digital content that includes the navigational link that is enabled.

2. The method of claim 1, wherein the active state of the first page is set to the retiring state when it is determined that the load time for the second page of digital content is greater than a predefined period of time.

3. The method of claim 1 further comprising presenting, on the display, an advertisement when the active state of the first page of digital content is set to the retiring state.

4. The method of claim 1, wherein the first page of digital content is modified to include a visual notification that the second page is ready for presentation when the active state of the first page is set to the transacting state.

5. The method of claim 4, wherein the visual notification disappears in proportion to the expiration of the predefined period of time.

6. The method of claim 1, wherein the second page of digital content includes content and images, wherein the second page is ready for presentation when the content has been received irrespective of the images.

7. The method of claim 1, wherein the first page of digital content is modified to include a status indicator to illustrate the progress of receiving the second page of digital content.

8. A non-transitory computer readable storage medium storing one or more programs, the one or more programs comprising instructions for:
presenting, on a display, a first page of digital content having an active state set to a reading state, wherein the first page of digital content includes a navigational link that is enabled;
receiving a request to display a second page of digital content;
in response to the request, setting the active state of the first page of digital content to a retiring state;
in response to detecting that the active state of the first page of digital content is the retiring state, presenting, on the display, a version of the first page of digital content that includes the navigational link that is disabled;

receiving the second page of digital content;

determining that the second page of digital content is ready for presentation;

in response to the determination, setting the active state of the first page of digital content to a transacting state;

upon determining that the active state of the first page of digital content has been set to the transacting state for a predefined period of time without receiving a termination request, presenting, on the display, the second page of digital content; and upon determining that the termination request is received within the predefined period of time, setting the active state of the first page of digital content to the reading state and presenting the first page of digital content that includes the navigational link that is enabled.

9. The non-transitory computer readable storage medium of claim 8, wherein the active state of the first page is set to the retiring state when it is determined that the load time for the second page of digital content is greater than a predefined period of time.

10. The non-transitory computer readable storage medium of claim 8, the one or more programs further comprising instructions for presenting, on the display, an advertisement when the active state of the first page of digital content is set to the retiring state.

11. The non-transitory computer readable storage medium claim 8, wherein the first page of digital content is modified to include a visual notification that the second page is ready for presentation when the active state of the first page is set to the transacting state.

12. The non-transitory computer readable storage medium of claim 11, wherein the visual notification disappears in proportion to the expiration of the predefined period of time.

13. The non-transitory computer readable storage medium of claim 8, wherein the second page of digital content includes content and images, wherein the second page is ready for presentation when the content has been received irrespective of the images.

14. The non-transitory computer readable storage medium of claim 8, wherein the first page of digital content is modified to include a status indicator to illustrate the progress of receiving the second page of digital content.

15. A computer implemented system comprising:

a processor;

a display; and memory storing instructions configured to:

present, on a display, a first page of digital content having an active state set to a reading state, wherein the first page of digital content includes a navigational link that is enabled;

receive a request to display a second page of digital content;

in response to the request, set the active state of the first page of digital content to a retiring state;

in response to detecting that the active state of the first page of digital content is the retiring state, present, on the display, a version of the first page of digital content that includes the navigational link that is disabled;

receive the second page of digital content;

determine that the second page of digital content is ready for presentation;

in response to the determination, setting the active state of the first page of digital content to a transacting state;

upon determining that the active state of the first page of digital content has been set to the transacting state for a predefined period of time without receiving a termination request, present, on the display, the second page of digital content; and upon determining that the termination request is received within the predefined period of time, setting the active state of the first page of digital content to the reading state and presenting the first page of digital content that includes the navigational link that is enabled.

16. The computer implemented system of claim 15, wherein the active state of the first page is set to the retiring state when it is determined that the load time for the second page of digital content is greater than a predefined period of time.

17. The computer implemented system of claim 15, wherein the instructions are further configured to present, on the display, an advertisement when the active state of the first page of digital content is set to the retiring state.

18. The computer implemented system of claim 15, wherein the first page of digital content is modified to include a visual notification that the second page is ready for presentation when the active state of the first page is set to the transacting state.

19. The computer implemented system of claim 18, wherein the visual notification disappears in proportion to the expiration of the predefined period of time.

20. The computer implemented system of claim 15, wherein the first page of digital content is modified to include a status indicator to illustrate the progress of receiving the second page of digital content.

* * * * *